US012684313B2

(12) United States Patent
Humphrey

(10) Patent No.: US 12,684,313 B2
(45) Date of Patent: Jul. 14, 2026

(54) MULTI-PATH LOCATION TRACKING AND NORMALIZATION

(71) Applicant: Road Rally, Inc., Lehi, UT (US)

(72) Inventor: Rachel Veann Humphrey, Lehi, UT (US)

(73) Assignee: Road Rally, Inc., Lehi, UT (US)

( * ) Notice: Subject to any disclaimer, the term of this patent is extended or adjusted under 35 U.S.C. 154(b) by 303 days.

(21) Appl. No.: 18/523,361

(22) Filed: Nov. 29, 2023

(65) Prior Publication Data

US 2025/0175763 A1 May 29, 2025

(51) Int. Cl.
  *H04W 4/029* (2018.01)
  *G06F 3/0481* (2022.01)
  *G06F 3/16* (2006.01)
(52) U.S. Cl.
  CPC .......... *H04W 4/029* (2018.02); *G06F 3/0481* (2013.01); *G06F 3/167* (2013.01)
(58) Field of Classification Search
  CPC ......... H04W 4/029; G06F 3/481; G06F 3/167
  See application file for complete search history.

(56) References Cited

U.S. PATENT DOCUMENTS

2018/0180429 A1  6/2018  De Lorenzo et al.
2018/0374113 A1  12/2018  Ramirez et al.

2022/0053607 A1*  2/2022  Rice .................... H04W 72/569
2022/0203973 A1  6/2022  Dronen et al.
2023/0080281 A1  3/2023  Kundu et al.

FOREIGN PATENT DOCUMENTS

WO    WO-2014151793 A2 *  9/2014  ........... G08G 1/0133

OTHER PUBLICATIONS

International Search Report and Written Opinion received for PCT Application No. PCT/US2024/056561 filed Nov. 19, 2024, 12 pages.

* cited by examiner

*Primary Examiner* — William G Trost, IV
(74) *Attorney, Agent, or Firm* — Workman Nydegger

(57) ABSTRACT

Tracking a plurality of users. A method includes, for a plurality of paths obtaining a normalization normalizing each of the paths to each other. Each of at least some segments of a path has an assigned a parity value. Location signals are received from a plurality of location hardware devices, each corresponding to a user in a plurality of users. Each of the users encounter a different path from among the plurality of paths than other users. The location hardware signals are used to track the plurality of users' progression through at least a portion of the segments. For each of the users, a path score is determined based on the normalization and parity values for segments. A correlation of the path scores in the plurality of path scores is created and sent over a computing network to a plurality of computing devices located at different locations.

20 Claims, 6 Drawing Sheets

*500*    *502*

For A Plurality Of Paths Obtain A Normalization Normalizing Each Of The Paths To Each Other

*504*

Receive Location Signals From A Plurality Of Location Hardware Devices

*506*

Using The Location Hardware Signals, Track The Plurality Of Users' Progression Through At Least A Portion Of The Segments

*508*

Determine A Path Score, To Create A Plurality Of Path Scores, Path Scores For Users Being Based On The Normalization Normalizing Each Of The Paths To Each Other And Parity Values For Segments

*510*

Create A Correlation Of The Path Scores In The Plurality Of Path Scores

*512*

Send The Correlation Of The Path Scores Over A Computing Network To A Plurality Of Computing Devices Located At Different Locations

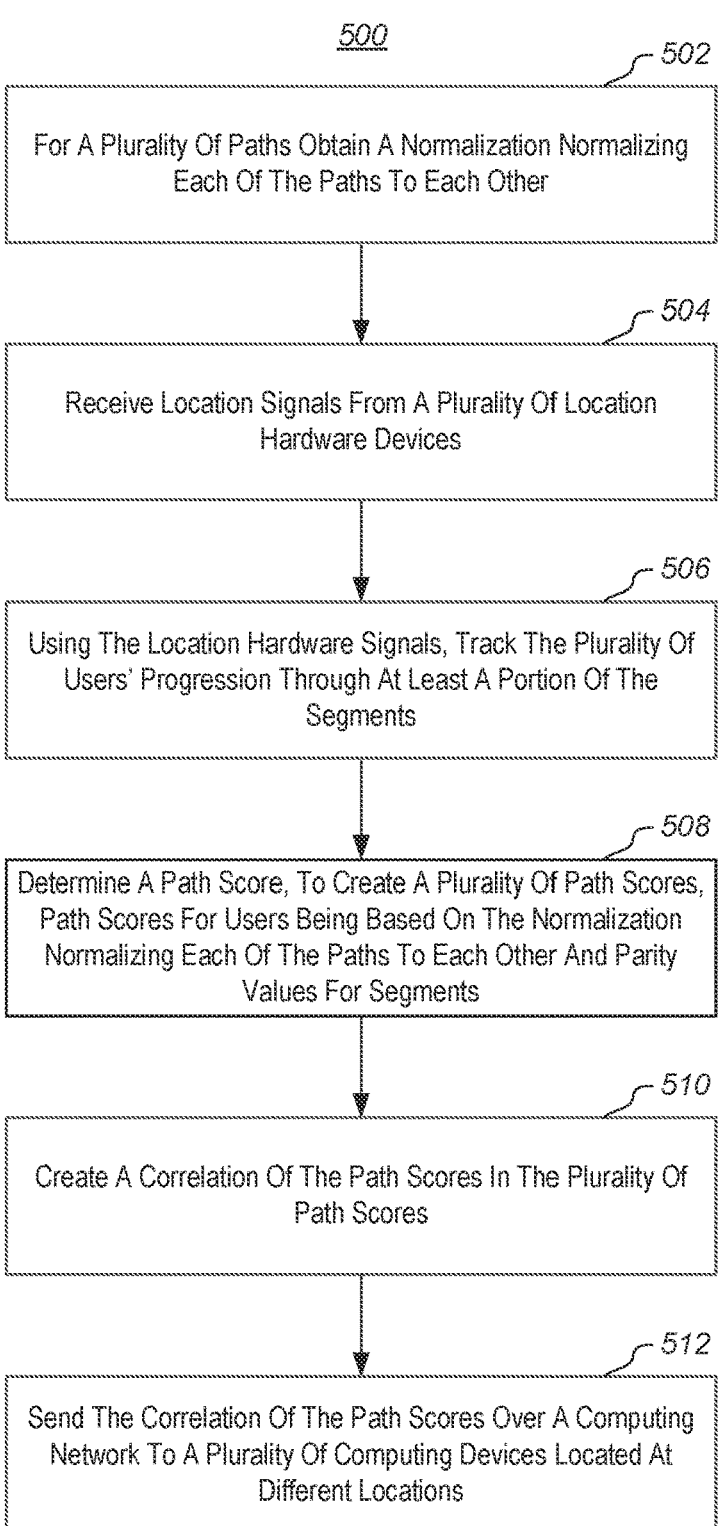

*500*

*502*

For A Plurality Of Paths Obtain A Normalization Normalizing Each Of The Paths To Each Other

*504*

Receive Location Signals From A Plurality Of Location Hardware Devices

*506*

Using The Location Hardware Signals, Track The Plurality Of Users' Progression Through At Least A Portion Of The Segments

*508*

Determine A Path Score, To Create A Plurality Of Path Scores, Path Scores For Users Being Based On The Normalization Normalizing Each Of The Paths To Each Other And Parity Values For Segments

*510*

Create A Correlation Of The Path Scores In The Plurality Of Path Scores

*512*

Send The Correlation Of The Path Scores Over A Computing Network To A Plurality Of Computing Devices Located At Different Locations

*Figure 5*

MULTI-PATH LOCATION TRACKING AND NORMALIZATION

BACKGROUND

Background and Relevant Art

Systems for tracking user movements are ubiquitous. For example, nearly every modern cellular telephone includes tracking hardware that can track a user location by virtue of the cellular telephone's proximity to the user. Further, apps on the cellular telephones use the tracking hardware to track user locations in the particular context of each of the apps.

Some tracking systems, including hardware and apps, track a user's path toward completion including tracking a beginning point, various intermediate waypoints, and an endpoint. While this is generally suitable for individual tracking, there may be a desire for collective tracking of multiple different users with respect to each other. That is, it may be useful to detect the progress of multiple different users and to coordinate that progress with respect to each other. In particular, it may be useful to monitor the completeness of paths of different users with respect to each other.

However, one problem that arises in this context is that different users may traverse different paths so that a user's progress cannot be compared directly with other users' progress. Additionally, users may perform known activities between geographical waypoints. These known activities introduce additional time required to traverse a path and thus makes comparative tracking even more difficult. Thus, a technical problem exists whereby it is difficult to track different users traversing different paths and to effectively compare the progress of the different users.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a for tracking a plurality of users. The method includes for a plurality of paths obtaining a normalization normalizing each of the paths to each other. Each path comprises serially encountered segments. At least a portion of the segments are geographically traversable segments. Each of the paths in the plurality of paths has a different configuration of segments, including at least one of a different set of segments or a different order of segments. Each segment has an assigned a parity value. The method further includes receiving location signals from a plurality of location hardware devices. Each location hardware device in the plurality of location hardware devices corresponds to a user in a plurality of users. Each of the users encounters a different path from among the plurality of paths than other users. The location hardware signals are used to track the plurality of users' progression through at least a portion of the segments. For each of the users, a path score is determined, to create a plurality of path scores. Path scores for users are based on the normalization normalizing each of the paths to each other and parity values for segments. A correlation of the path scores in the plurality of path scores is created. The correlation of the path scores is sent over a computing network to a plurality of computing devices located at different locations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5 illustrates a method of multi-path location tracking and normalization.

DETAILED DESCRIPTION

Figure 1:
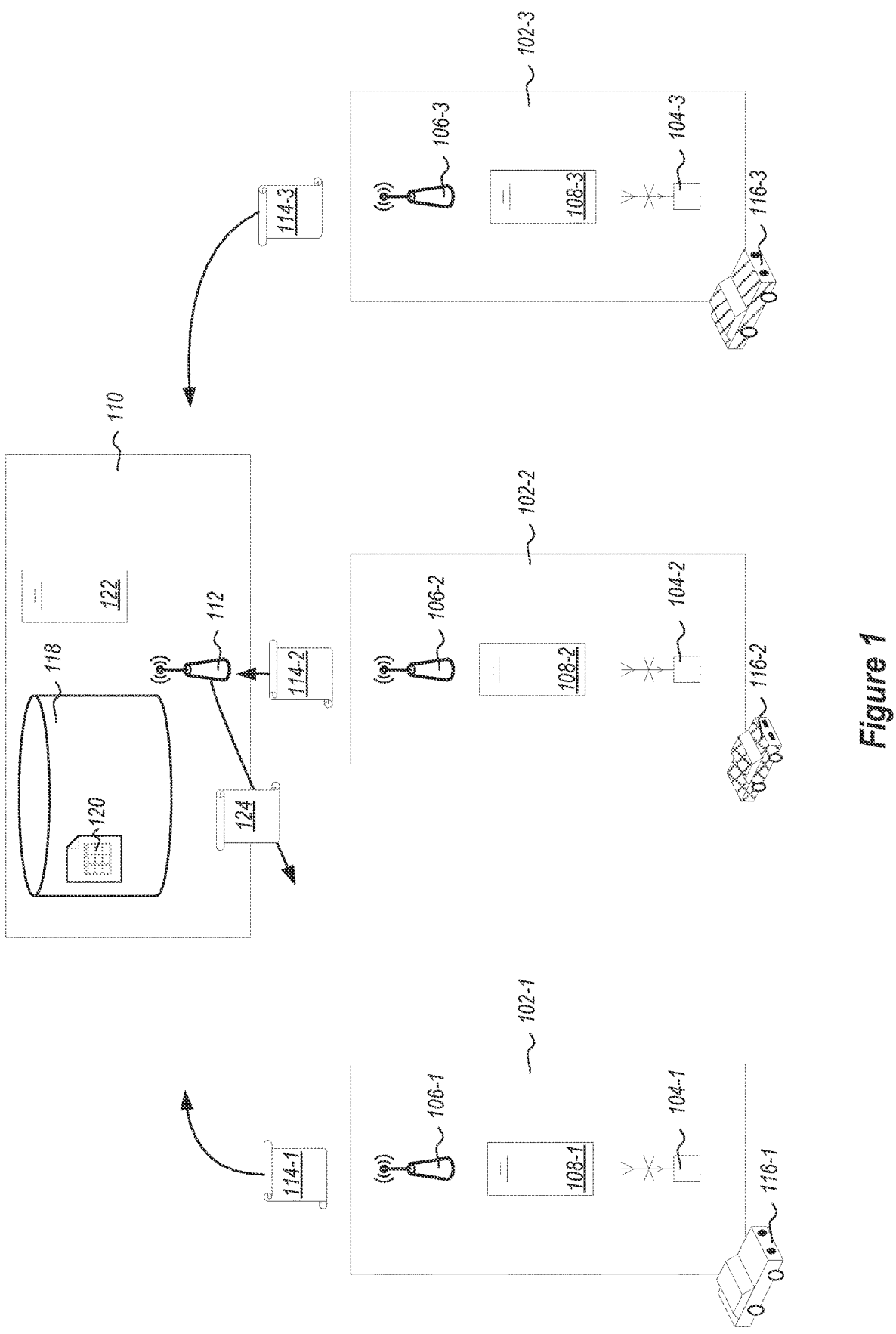
FIG. 1 illustrates a system and environment for multi-path location tracking and normalization.

Embodiments illustrated herein receive location signals provided over a computing network from location hardware for different users. Embodiments normalize different paths for different users to make the different paths equivalent according to some predetermined measure. The location signals are used, along with normalization information, to perform a correlated tracking of the different users. In one example, each path has a normalized path value that is equivalent to the normalized path value of the other paths. In particular each path may include various segments. A given segment may be a geographically traversable segment or a performative task segment. Each of the geographically traversable segments (and optionally in some embodiments, the performative task segments) is assigned a parity value. Operations on parity values, to create or apply one or more normalization factors (either for the path as a whole or for individual segments) will equal the normalized path value. For example, assume that each path has a normalized path value of 1. A particular path may have normalized parity values, with parity factors pre-applied, of 0.25, 0.36, 0.14, and 0.35 for corresponding segments in the path. The summation of these normalized parity values is equal to 1. Different paths will have different segments, and thus a given segment from one path may not be directly comparable to any segment in a different path. Nonetheless, users may be tracked using location hardware along each their individual path to identify when segments have been completed, and parity value summations for the various users may be compared to determine how individual users are progressing through each their individual path as compared to other users traversing through other paths. In alternative embodiments, normalization is simply performed by determining a total amount of extra time, as compared to the parity values, that a user takes to traverse a path. In yet another example, normalization may be performed by certain weighting operations as will be illustrated in more detail below.

In some embodiments, the parity values may be determined based on an amount of time to complete a given segment. Normalization may be based on different anticipated times to complete different entire paths. While different paths may have different anticipated times to completion, each path includes a normalized path value that is equivalent to normalized path values of other paths. Similarly, each path may have different anticipated times to complete segments than other paths. Nonetheless, traversal of each of the different paths can be compared to one another by using the various parity values for each segment, with normalization applied to completed segments.

Note that each user may be associated with a computing device that includes location hardware that can identify a location of the computing device. Further, the computing device includes network communication hardware that is coupled to the location hardware. In some embodiments this may be through various processors and buses included on the computing device. The computing device can use the network communication hardware to transmit location information to a centralized server. The centralized server receives location information through network communication hardware from a plurality of user computing devices. This allows the centralized server to compile a report comparing progress of users, even though the users are traversing different paths.

In some embodiments that can be used to determine efficiency in traversing particular geographically traversable segments, the parity values for segments can compared to actual time to complete segments. Thus, for example, if a user completes a segment in exactly the amount of time anticipated to complete the segment, full efficiency weighting will be given to that segment. In contrast, completing a segment in a time longer than that anticipated by a parity value for the segment indicates an efficiency of less than full efficiency, where the efficiency can be determined by computation. For example, one example of efficiency may be computed by computing (anticipated time to complete segment)/(actual time to complete segment). In some embodiments, efficiencies may be determined real time as paths are being traversed. Alternatively, or additionally, efficiencies may be determined after tracking of path traversal has been completed.

In some embodiments, in the interest of safety, completing a segment faster than the anticipated time to complete a segment will result in a path score penalty so as to encourage users to not exceed safety limits, such as speed limits. In this way, the centralized server can correlate user progression through paths by amount of the path completed, but with penalties applied for exceeding safety standards. Thus, users can be ranked by factors including normalization of segments that have been completed combined with penalties.

Consider for example the following example. Assume that a family chooses to visit an amusement park. Each of the children in the family is to ride each ride one time and play each game one time. Each child in the family carries a computing device having location hardware and network communication hardware. Geographically traversable segments for a given path for a given child includes movement from ride to ride, movement from ride to game, movement from game to ride, or movement from game to game. Performative task segments include riding a ride or playing a game. Each of the various segments has an anticipated time to complete. Routes for each of the children may be determined in a number of different fashions. For example, in some embodiments the paths are determined after completion of the paths. In other embodiments, paths are determined based on predetermined instructions given to the children. In other embodiments paths are anticipated using machine learning systems or similar systems that are able to efficiently predict paths.

Using the functionality described above, embodiments can determine a percent of a completed visit at the amusement park for each child. Embodiments may further determine comparisons between the children during the amusement park visit. If the centralized server determines that certain children are falling behind or that other children are moving too quickly, the children falling behind can be encouraged to move more quickly or the children moving too quickly may be encouraged to move slower respectively by transmitting messages across the network communication hardware to computing devices held by the children. The preceding example illustrates just one use of embodiments of the invention but is not limiting inasmuch as embodiments of the invention may be used for many different uses and scenarios. For example, the following illustrates a scenario that can be used where various users are operating vehicles simultaneously and exploring various waypoints, but doing so by traversing different paths.

Additional details are now illustrated. FIG. 1 illustrates a plurality of computing devices 102-1, 102-2, and 102-3. Note that while three computing devices are illustrated, it should be appreciated that in other embodiments as few as two computing devices may be used or many more than three computing devices may be used.

Each of the computing devices includes location hardware 104-1, 104-2, and 104-3 respectively. Such location hardware may be for example global positioning satellite (GPS) hardware such as various radios, antennas and the like. Alternatively, or additionally, such location hardware may be for example network hardware used in conjunction with remote location services that can correlate local networks with locations. Alternatively, or additionally, such location hardware may be for example radio frequency identifier (RFID) hardware that is able to transmit information to known receivers having known locations. Alternatively, or additionally, such location hardware may be for example radio hardware configured to receive signals from beacons in known locations, etc. The location hardware in each computing device is able to determine the location of the corresponding computing device.

Each of the computing devices 102-1, 102-2, and 102-3 also includes network communication hardware 106-1, 106-2, and 106-3 respectively. The network communication hardware is coupled to the location hardware in a corresponding computing device to allow the network communication hardware to transmit location information to a centralized server 110. The centralized server 110 includes network communication hardware 112 configured to receive signals from the network communication hardware 106-1, 106-2, and 106-3 from the computing devices 102-1, 102-2, and 102-3 respectively.

Note that each of the computing devices may also include hardware processors 108-1, 108-2, and 108-3 in computing devices 102-1, 102-2, and 102-3, respectively. Further, each of the computing devices may include electronic interconnects between the hardware processors and various components such as the location hardware and the network communication hardware. This allows the location hardware to provide location information to the processor where the location information (or derivatives thereof) can then be provided to the network communication hardware for transmission to the centralized server 110. In particular, location signals 114-1, 114-2, and 114-3 for the computing devices 102-1, 102-2, and 102-3 respectively, based on the location information is provided to the centralized server 110 where it is received by the network communication hardware 112.

Note that the location signals can take one or more of a number of different forms. For example, the location signals may in their most basic form indicate the location of a corresponding computing device. For example, the location signal 114-1 may provide GPS coordinates for the computing device 102-1. Each of the computing devices may serve as a proxy for a user. For example, the computing device 102-1 is a proxy for user 116-1, computing device 102-2 is a proxy for user 116-2, and computing device 102-3 is a proxy for user 116-3. The users in this example comprise vehicles. In this way, location signals can be applicable to a user so long as the corresponding computing device is co-located with the user. In these embodiments, the centralized server 110 can determine when a user has traversed a geographically traversable segment so long as the corresponding location signal reaches the centralized server 110 within a predetermined allowable amount of time. For example, the centralized server 110 may be able to determine when a user has begun a particular geographically traversable segment and when the user has completed a geographically traversable segment. The centralized server 110 can then use a clock located at the centralized server 110 or readily accessible to the centralized server 110 to determine an amount of time required for the user to complete the geographically traversable segment. In some embodiments, the centralized server 110 can also determine various specific time points of traversal as determined by comparison of a clock time value to some standardized time, such as GMT.

In other embodiments, the location signals may include information about completion of a geographically traversable segment. For example, a location signal may be sent from a device to the centralized server 110 when a geographically traversable segment has been completed. In some embodiments, the location signal may further include an amount of time taken to complete the geographically traversable segment.

The centralized server 110 includes various elements for multi-path tracking and normalization. For example, the centralized server 110 includes the previously discussed network communication hardware 112 that receives the location signals from the computing devices.

The centralized server further includes a datastore 118 which stores the received location signals. In some embodiments, the datastore 118 further includes the aforementioned distance matrix 120 including a correlation of various segments to anticipated times to complete the segments.

The centralized server 110 further includes a hardware processor 122. The hardware processor 122 may be configured to perform the various functionalities described above including applying normalization to path values for the various paths of the users so as to be able to perform coordinated multipath location and tracking functionality. The hardware processor 122 may further be configured to create a correlation of the path scores for the various users. The hardware processor 122 can cause the network communication hardware 112 to broadcast the correlation 124 to various computing devices such as the computing devices 3102-1, 102-2, and 102-3, or other computing devices.

Figure 2:
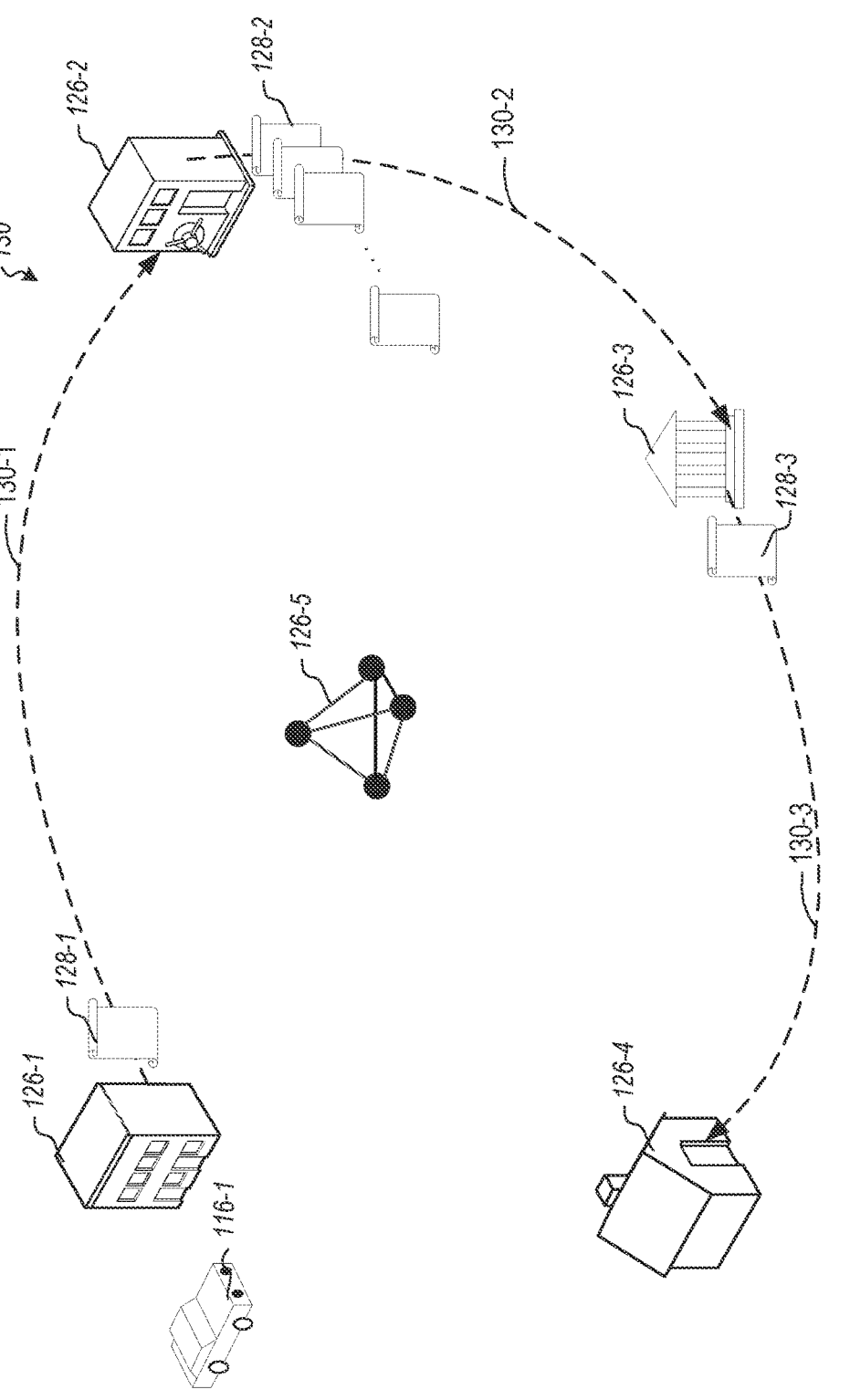
FIG. 2 illustrates a path for a first user.
Figure 3:
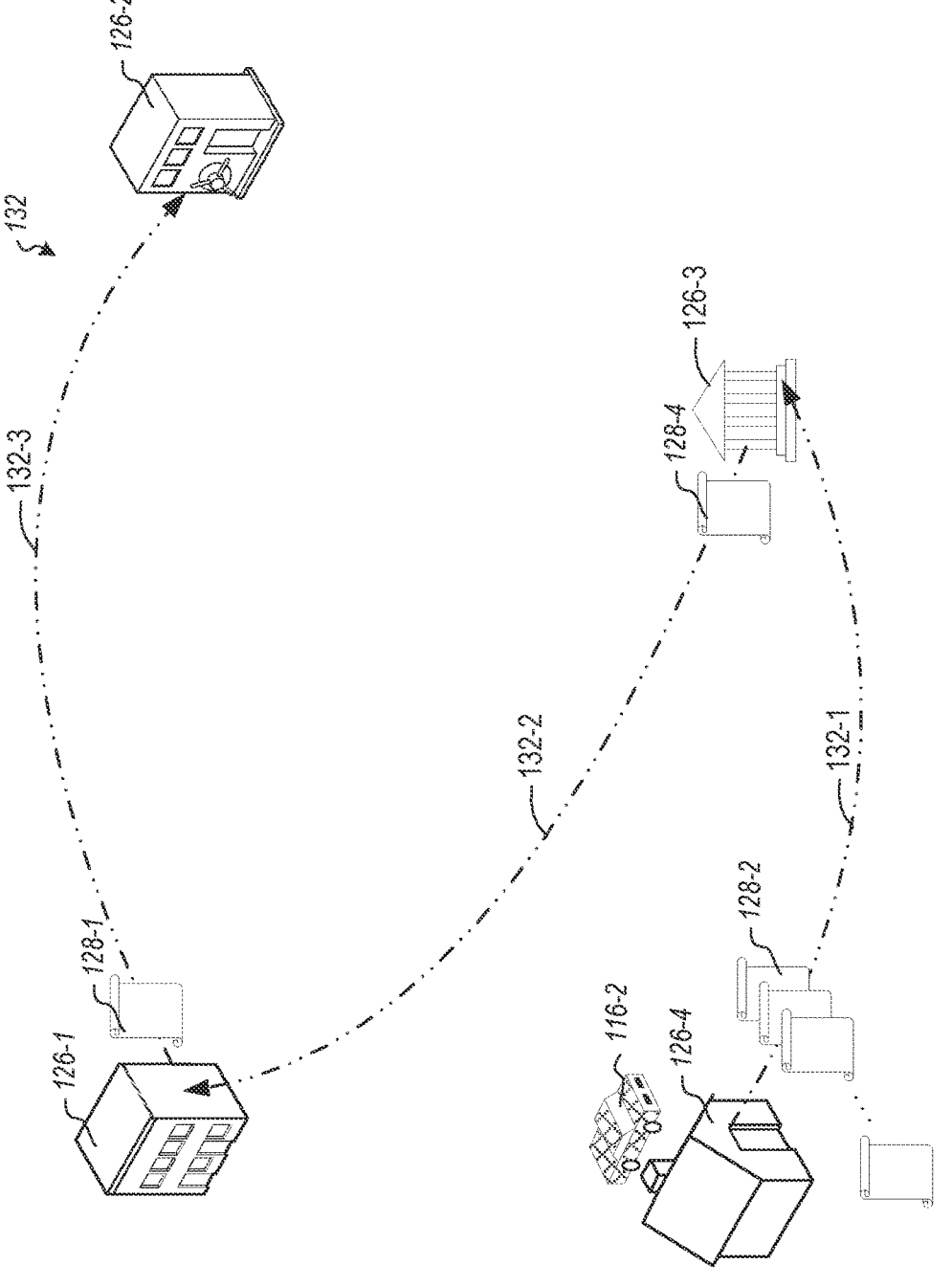
FIG. 3 illustrates a path for a second user.
Figure 4:
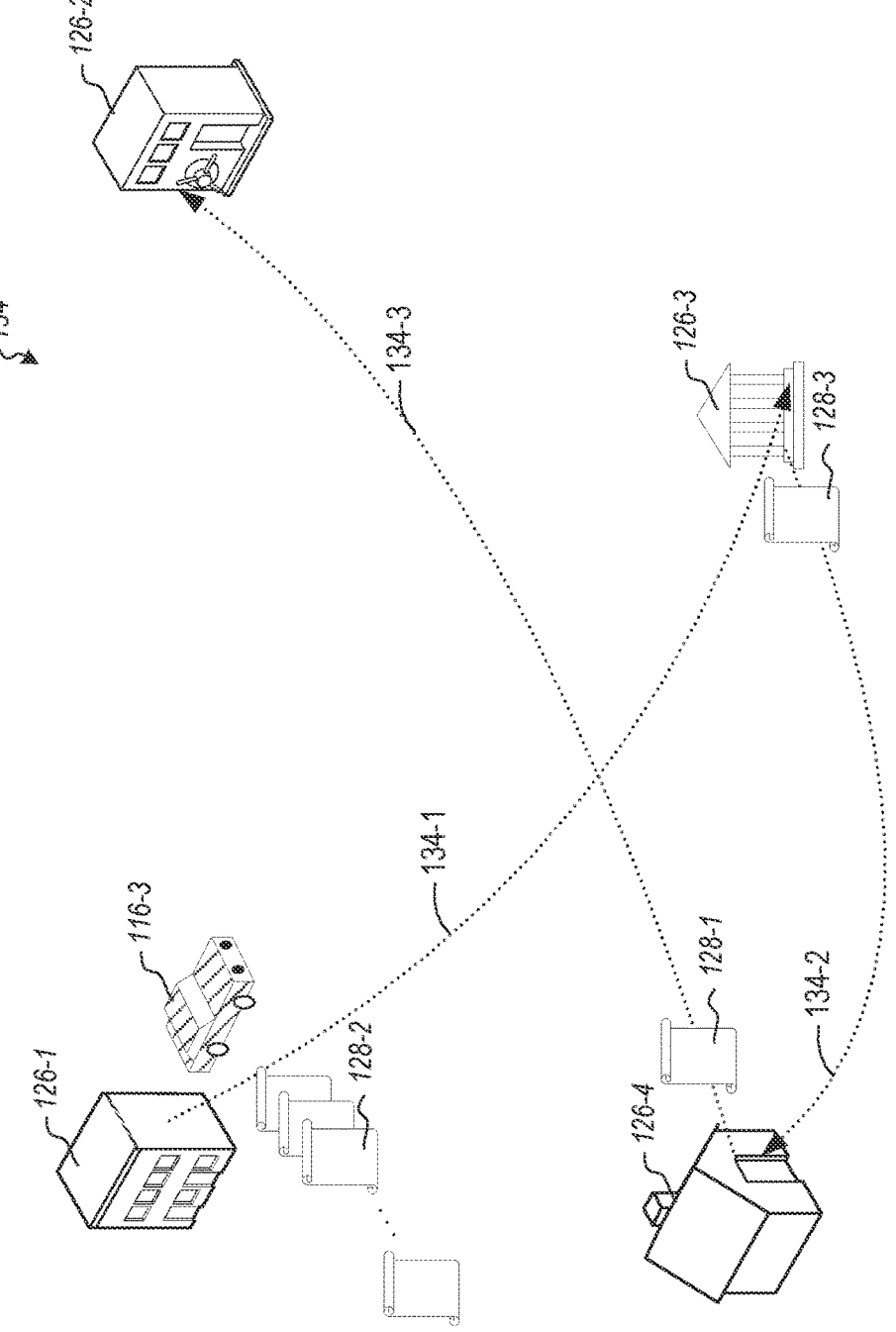
FIG. 4 illustrates a path for a third user.

Referring now to FIGS. 2, 3, and 4, various additional details are illustrated. FIG. 2 illustrates an example where a path 130 is traversed. FIG. 3 illustrates an example where a path 132 is traversed. FIG. 4 illustrates an example where a path 134 is traversed.

As illustrated in FIG. 2, a user 116-1 traverses the path 130. Traversing the path 130 comprises traversing geographically traversable segments 130-1, 130-2, and 130-3 from waypoints 126-1, 126-2, 126-3, and 126-4.

Additionally, performative task segments 128-1, 128-2, and 128-3 are illustrated. In this example, the user 116-1 begins at waypoint 126-1 and performs the performative task segment 128-1. In some examples, the performative task segment 128-1 may include inputting certain information into a user interface of the computing device 102-1 (see FIG. 1). In some embodiments, the performative task segment 128-1 may have an association with the waypoint 126-2. For example, the user 116-1 may need to perform the performative task segment 128-1 to identify waypoint 126-2. Once the user has performed the performative task segment 128-1 the user proceeds along the segment 130-1 to the waypoint 126-2. As discussed above, performing the performative task segment 128-1 may include inputting information into the computing device 102-1. Information can be sent from the computing device 102-1 using the network communication hardware 106-1 to send an indication to the centralized server 110 where the indication is received by the network communication hardware 112. Indeed, in some embodiments, the centralized server 110 may provide user interface elements to the computing device 102-1 to allow the user to perform the performative task segment 128-1. Thus, by inputting information into the user interface, such information will be provided to the centralized server 110. In some embodiments, performing a performative task segment may provide additional information to the user to determine a next waypoint, and thus, a next geographically traversable segment.

As discussed previously, the user 116-1 traverses the geographically traversable segment 130-1. Location signals 114-1 are provided to the centralized server 110 which allows the centralized server 110 to determine that the segment 130-1 has been completed. As discussed previously, each of the paths are normalized to each other so as to have some type of equivalency. That is, path 130 is equivalent to path 132 which is equivalent to path 134 even though each of the paths comprises different geographically traversable segments. As noted, this is achieved by normalizing the paths to each other. Thus, once the user has traversed the geographically traversable segment 130-1, normalization is applied to a parity value for the geographical traversable segment 130-1 to compute a path score for the user 116-1. This path score can be correlated with path scores for the other users 116-2 and 116-3 as they traverse each their individual paths 132 and 134 respectively. In some embodiments, the parity value is a time value of an expected time to complete a geographically traversable segment.

Note that while each of the paths 130, 132, and 134 have three geographically traversable segments, due to the normalization, different users may have different path scores even if they have traversed the same number of geographically traversable segments. For example, consider the case where the geographically traversable segment 130-1 has a parity value consistent with it being 50% of the summation of the parity values for geographically traversable segments 130-1, 130-2, and 130-3. Geographically traversable segment 132-1 has a parity value consistent with 45% of the sum of the parity values for the entire path 132 including geographically traversable segments 132-1, 132-2, and 132-3. Geographically traversable segment 134-1 has a parity value of 30% of the summation of the parity values for the path 134 including parity values for geographically traversable segment 134-1, 134-2, and 134-3. If each of the users 116-1, 116-2, and 116-3, have each completed one geographically traversable segment 130-1, 132-1, and 134-1 respectively, user 116-1 will still be ranked highest followed by user to 116-2, followed by user 116-3.

Performing performative task segments may be required before traversing a geographically traversable segment, and thus will delay users from traversing various geographically traversable segments. In the example illustrated in FIG. 2, performative task segment 128-1 must be performed before proceeding to the waypoint 126-2 along the geographically traversable segment 130-1. Indeed, in some embodiments, completing the performative task segment 128-1 may help the user identify the waypoint 126-2. Similarly, a multistep performative task segment 128-2 must be completed before traversing the geographical the traversable segment 130-2. Similarly, performing performative task segment 128-3 may be required before traversing the geographically traversable segment 130-3 to the waypoint 126-4.

In some embodiments, geographically traversable segments may need to be traversed prior to receiving user interface elements at the computing devices to allow users to perform the performative task segments. For example, user interface elements for the performative task segment 128-2 may not be provided to the computing device 102-1 for the user 116-1 until the user has traversed the geographically traversable segment 130-1. Similarly, user interface elements for the performative task segment 128-3 may not be provided until the user has traversed the geographically traversable segment 130-2 to the waypoint 126-3.

Similar examples are illustrated in FIGS. 3 and 4. For example, in FIG. 3, the user 116-2 traverses the path 132 by beginning at the waypoint 126-4, performing performative task segment 128-2, traversing the geographically traversable segment 132-1 to the waypoint 126-3, performing the performative task segment 128-4, traversing the geographically traversable segment 132-2 to the waypoint 126-1, performing the performative task segment 128-1, and traversing the geographically traversable segment 132-3 to the waypoint 126-2.

In FIG. 4, the user 116-3 begins at the waypoint 126-1 and performs the performative task segment 128-2. The user then traverses the geographically traversable segment 134-1 to the waypoint 126-3. The user then performs the performative task segment 128-3. The user then traverses the geographically traversable segment 134-2 to the waypoint 126-4. The user then performs the performative task segment 128-1. The user then traverses the geographically traversable segment 134-3 the waypoint 126-2.

As each of the various users traverse the various paths, path scores are determined. Each of the user's progress on each their own path can be compared using the various path scores along with normalization of the various paths.

Various different path score determinations can be used. For example, in one embodiment, a raw time difference is used to determine a path score. For each path a score is computed by "user total time−distance matrix time (i.e., sum of parity values for completed segments)=path score". Note that in some embodiments, segments scores may be generated in a similar fashion to determine efficiency in traversing a segment. So, for a set of completed geographically traversable segments, if a user had a time 12, and the sum of matrix times for those segments is 10, the path score is 2. The best score among different paths is then the lowest total time difference for completed paths. That is, lower scores are ranked higher. By different segments having different parity values in the distance matrix, and using the subtraction indicated, paths are normalized inasmuch as the path score is a measure of excess time spent. Thus, in this example, obtaining normalization normalizing each of the paths to each other is performed by accessing the distance matrix and performing the difference operation between actual time and matrix time. This method of computing paths scores is simple to understand. However, it is more dependent on the total distance travelled and may penalize users who have to travel longer distances. For example, user 1 only needs to travel 5 minutes to their second performative task segment, but user 2 needs to travel 15 minutes. Team 2 is far more likely to be impacted by negative traffic conditions, bad stop lights, and so on, meaning they are far more likely to get a worse path score.

In an alternative embodiment of a path score determined based off of a total time for all geographically traversable segments completed as well as performative task segments, an exponential weighting may be applied to compute a path score. For example, consider one specific example where if a user time equals distance matrix time, the path score is (in this example) is 100. As the user time (i.e., actual user time in traversing geographically traversable segments and performing performative task segments) gets further away from the distance matrix time (i.e., sum of distance matrix time for completed segments), the path score is reduced exponentially until it hits a lower limit of 20 points. For example, if a total user time is 15, and matrix time sum for completed segments is 10, the path score would be 70 (in one example). For this example, the path score is computed by "20+40* $(1+\tan h(5*(1.55-(\text{user time}-\text{matrix time})/\text{matrix time})))$" where tan h is the hyperbolic tangent. In this example, higher scores are ranked higher. This method is more complicated, but with respect to the two user examples above, it normalizes the distances traveled. The user which needs to travel further is given more flexibility than the user that only needs to travel 5 minutes. Note that this method also has an advantage in that if a single user ends up getting stuck on a performative task segment, the effect on the rest of their score is mitigated.

As discussed previously, the path score may further include a penalty applied if unsafe conditions are detected. For example, when a user arrives to a waypoint and/or performative task segment, the time it took them to arrive to the waypoint and/or performative task segment is compared to the safe expected time in the distance matrix. If the user time is greater than or equal to the distance matrix time, the base time illustrated above will be unaffected for the path scoring calculation. If the user time is less than the distance matrix expected time, in one embodiment, the user gets a base time equal to the user time+(distance matrix time−user time)$^{1.5}$. For example, if distance matrix time is 10, and user time is 5, the resulting base time would be 5+11=16. If user time is 9 minutes, the base time is 9+1=10. Finally, if the user time is 1, the base time is 1+27=28. This ensures that the more severe the difference, the more severe the penalty. Additionally, the user will be forced to wait for (distance matrix time−user time) minutes before being able to receive the next performative task to ensure that users cannot get too far ahead in the path traversal and prevent a "cheating speed user" from cheating to learn all of the clues and sharing the clues to the "cheating exact user".

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Referring now to FIG. 5, a method 500 is illustrated. The method 500 includes acts for tracking a plurality of users. The method 500 includes for a plurality of paths obtaining a normalization normalizing each of the paths to each other (act 502). Each path comprises serially encountered segments. At least a portion of the segments are geographically traversable segments. Each of the paths in the plurality of paths has a different configuration of segments, including at least one of a different set of segments or a different order of segments. Each segment has an assigned parity value.

The method 500 further includes receiving location signals from a plurality of location hardware devices (act 504). Each location hardware device in the plurality of location hardware devices corresponds to a user in a plurality of users. Each of the users encounter a different path from among the plurality of paths than other users.

The method 500 further includes using the location hardware signals, tracking the plurality of users' progression through at least a portion of the segments (act 506).

The method 500 further includes for each of the users, determining a path score, to create a plurality of path scores, path scores for users being based on the normalization normalizing each of the paths to each other and parity values for segments (act 508).

The method 500 further includes creating a correlation of the path scores in the plurality of path scores (act 510)

The method 500 further includes sending the correlation of the path scores over a computing network to a plurality of computing devices located at different locations (act 512).

The method 500 may be performed where at least a portion of the serially encountered segments comprise user input segments requiring users to input data into one or more user interface elements for each of the user input segments. In some such embodiments, the method 500 further includes determining an amount of time to input certain data into a user interface element for a user input segment. The amount of time to input the certain data into the user interface element for the user input segment is used to determine the path score.

In some such embodiments, the method 500 further includes determining that a user has completed a geographically traversable segment, and as a result, providing the user interface element in a user interface of a device correlated to the user to facilitate the user encountering a user input segment.

In some embodiments, the user interface element comprises an audio user interface element. This may be accomplished by providing audio information to the user. Alternatively, this may be accomplished by receiving audio input from the user.

In some embodiments, certain data to be input into the user interface element is related to characteristics of a linearly previous segment. For example, a waypoint may have certain characteristics that may be used in determining what data to input into the user interface element.

The method 500 may be performed where at least a portion of the serially encountered segments comprise performative task segments requiring users to perform a task between geographically traversed segments. In some such embodiments, determining a path score comprises using an amount of time to complete a task. This may be by using the time as a separate operand or by using the time as part of another time, such as a total current traversal time.

The method 500 may further include determining that a given user has completed a given geographically traversable segment in the plurality of segments in an amount of time that is below a minimum safety threshold. As a result, in some embodiments, the method includes identifying a penalty value. Determining the path score for the given user comprises using the penalty value.

The method 500 may further include determining that a given user has completed a given geographically traversable segment in the plurality of segments in an amount of time that is below a minimum safety threshold. As a result, in some embodiments, the method includes delaying providing information to the given user regarding a serially next adjacent segment.

The method 500 may further include determining that a user has completed a given geographically traversable segment in the plurality of segments for a given path and as a result, providing the user information about a serially next adjacent segment in the given path. For example, if the user reaches the waypoint 126-2, the user may then be provided information from the centralized server 110 regarding the performative task segment 128-2.

The method 500 may be performed where each of the paths in the plurality of paths include the same waypoint but ordered in different orders. For example, the paths 130, 132, and 134 all include the same waypoints 126-1, 126-2, 126-3, and 126-4.

The method 500 may further include, for a given user, providing a user interface element in a user interface of a device correlated to the user directing the user to traverse to an ancillary waypoint in a segment, wherein the user interface element in the user interface identifies an ancillary benefit to traversing to the ancillary waypoint. For example, FIG. 2 illustrates an ancillary waypoint 126-5. While traversing the path 130, the user may be encouraged to divert to the ancillary waypoint 126-5 by the centralized server 110 providing information using the network communication hardware 112 to communicate a message to the computing device 102-1 indicting to the user some fact or motivation to divert to the ancillary waypoint 126-5.

Figure 6:
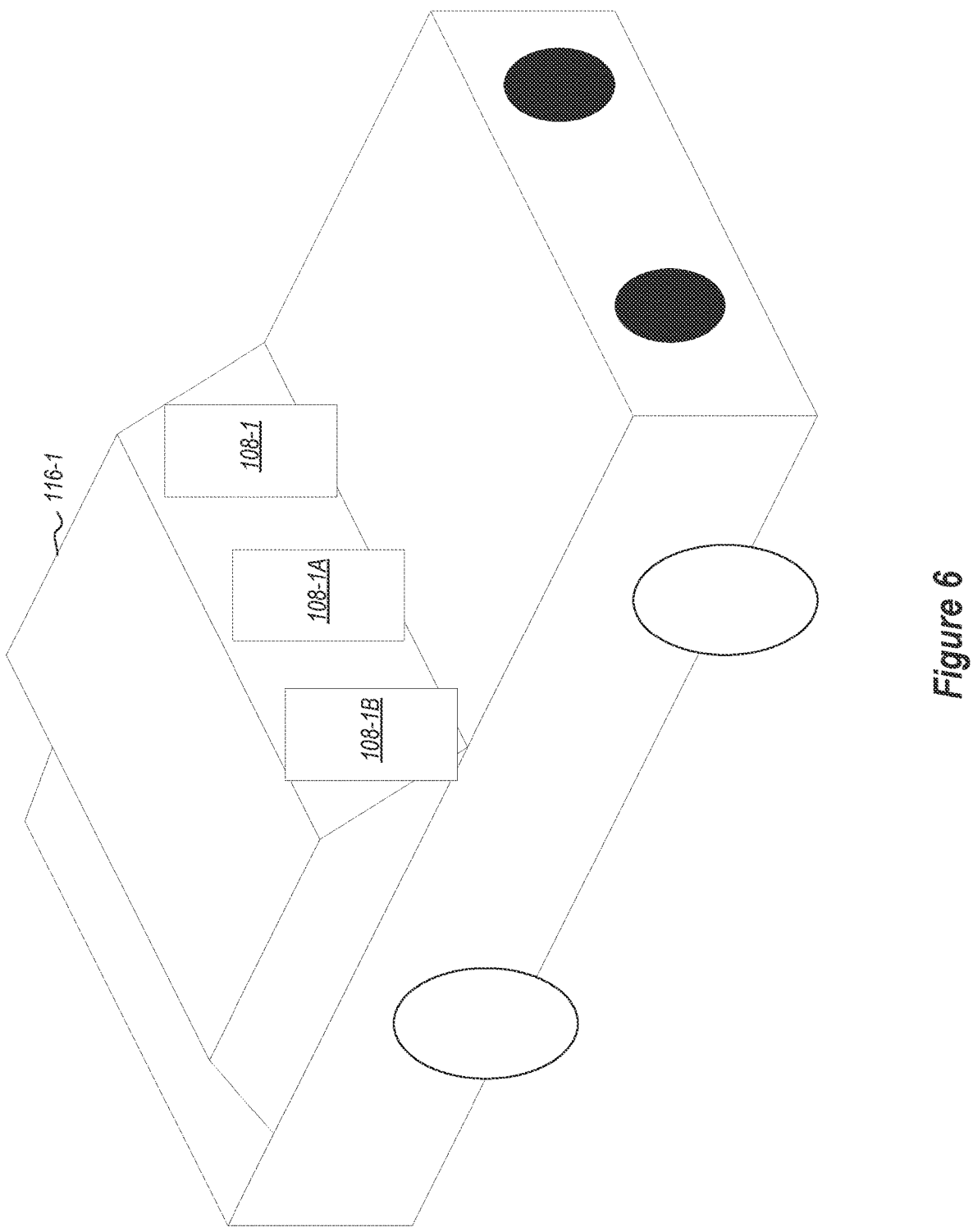
FIG. 6 illustrates a user having computing devices for a plurality of sub-users.

The method 500 may be performed where sending the correlation of the path scores over a computing network to a plurality of computing devices located at different locations comprises sending the correlation of the path scores to computing devices including the location hardware devices in the plurality of location hardware devices and to a plurality of different computing devices associated with the plurality of location hardware devices, but wherein location hardware signals and other user input from the different devices in the plurality of different devices are excluded from being used to determine weighted parity values in the plurality of weighted parity values. For example, with reference to FIG. 6, the user 116-1 may have sub users associated with it. Each of those sub users may also have computing devices associated with them, such as for example, computing devices 108-1A and 108-1B. These computing devices may receive the correlation 124 through network communication hardware on the computing devices, but will not be able to send information to the centralized server 110 related to location tracking and/or performing performative task segments.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of tracking a plurality of users, the method comprising:

for a plurality of paths, wherein each path comprises serially encountered segments, wherein at least a portion of the segments are geographically traversable segments, and wherein each of the paths in the plurality of paths has a different configuration of segments, including at least one of a different set of segments or a different order of segments, and wherein each segment has an assigned a parity value, obtaining a normalization that normalizes progress of the plurality of users relative to one another based on the plurality of paths;

receiving location signals from a plurality of location hardware devices, each location hardware device in the plurality of location hardware devices corresponding to a user in a plurality of users, each of the users encountering a different path from among the plurality of paths than other users;

using the location hardware signals, tracking the plurality of users' progression through at least a portion of the segments;

for each of the users, determining a path score, to create a plurality of path scores, path scores for users being based on the normalization that normalizes progress of the plurality of users relative to one another and parity values for segments;

creating a correlation of the path scores in the plurality of path scores; and sending the correlation of the path scores over a computing network to a plurality of computing devices located at different locations.

2. The method of claim 1, wherein at least a portion of the serially encountered segments comprise user input segments requiring users to input data into one or more user interface elements for each of the user input segments, the method further comprising using an amount of time to input certain data into a user interface element for a user input segment to determine the path score.

3. The method of claim 2, further comprising:

determining that a user has completed a geographically traversable segment, and as a result, providing the user interface element in a user interface of a device correlated to the user to facilitate the user encountering a user input segment.

4. The method of claim 3, wherein the user interface element comprises an audio user interface element.

5. The method of claim 2, wherein certain data to be input into the user interface element is related to characteristics of a linearly previous segment.

6. The method of claim 1, wherein at least a portion of the serially encountered segments comprise performative task segments requiring users to perform a task between geographically traversed segments, wherein determining a path score comprises using an amount of time to complete a task.

7. The method of claim 1, further comprising:

determining that a given user has completed a given geographically traversable segment in the plurality of segments in an amount of time that is below a minimum safety threshold; and as a result, identifying a penalty value and wherein determining the path score for the given user comprises using the penalty value.

8. The method of claim 1, further comprising:

determining that a given user has completed a given geographically traversable segment in the plurality of segments in an amount of time that is below a minimum safety threshold; and as a result, delaying providing information to the given user regarding a serially next adjacent segment.

9. The method of claim 1, further comprising:

determining that a user has completed a given geographically traversable segment in the plurality of segments for a given path; and as a result, providing the user information about a serially next adjacent segment in the given path.

10. The method of claim 1, wherein each of the paths in the plurality of paths include the same segments, but ordered in different orders.

11. The method of claim 1, further comprising, for a given user, providing a user interface element in a user interface of a device correlated to the user directing the user to traverse to an ancillary waypoint in a segment, wherein the user interface element in the user interface identifies an ancillary benefit to traversing to the ancillary waypoint.

12. The method of claim 1, wherein sending the correlation of the path scores over a computing network to a plurality of computing devices located at different locations comprises sending the correlation of the path scores to computing devices including the location hardware devices in the plurality of location hardware devices and to a plurality of different computing devices associated with the plurality of location hardware devices, but wherein location hardware signals and other user input from the different devices in the plurality of different devices are excluded from being used to determine weighted parity values in the plurality of weighted parity values.

13. A computing system for tracking a plurality of users, the computing system comprising:

network communication hardware configured to receive location signals from a plurality of location hardware devices, each location hardware device in the plurality of location hardware devices corresponding to a user in a plurality of users, each of the users encountering a different path from among a plurality of paths than other users; and one or more processors coupled to the network communication hardware configured to:

use the location hardware signals to track the plurality of users' progression through at least a portion of segments of the paths;

obtain a normalization that normalizes progress of the plurality of users relative to one another based on the plurality of paths;

for each of the users, determine a path score, to create a plurality of path scores, path scores for users being based on the normalization that normalizes progress of the plurality of users relative to one another and parity values for segments;

create a correlation of the path scores in the plurality of path scores; and cause the network communication hardware to send the correlation of the path scores over a computing network to a plurality of computing devices located at different locations.

14. The computing system of claim 13, wherein at least a portion of the segments comprise user input segments requiring users to input data into one or more user interface elements for each of the user input segments, the one or more processors further configured to provide a user interface over the network communication hardware to the users.

15. The computing system of claim 14, wherein the one or more processors are configured to determine that a user has completed a geographically traversable segment, and as a result, providing the user interface element in a user interface of a device correlated to the user to facilitate the user encountering a user input segment.

16. The computing system of claim 13, wherein at least a portion of the segments comprise performative task segments requiring users to perform a task between geographically traversed segments, and wherein determining a path score comprises using an amount of time to complete a task.

17. The computing system of claim 13, wherein the one or more processors are configured to:

determine that a given user has completed a given geographically traversable segment in the plurality of segments in an amount of time that is below a minimum safety threshold; and as a result, identify a penalty value and wherein determining the path score for the given user comprises using the penalty value.

18. The computing system of claim 13, wherein the one or more processors are configured to:

determine that a given user has completed a given geo-
graphically traversable segment in the plurality of
segments in an amount of time that is below a minimum
safety threshold; and as a result, delaying providing information to the given
user regarding a serially next adjacent segment.

19. A method of receiving information regarding tracking
of a plurality of users, the method comprising:

sending location signals from a location hardware device
to a centralized server configured to receive location
signals from a plurality of location hardware devices,
each location hardware device in the plurality of loca-
tion hardware devices corresponding to a user in a
plurality of users, each of the users encountering a
different path from among a plurality of paths than
other users; and receiving from the centralized server a correlation of path
scores over a computing network, the correlation of
path scores having been created by being based on a
normalization that normalizes progress of the plurality
of users relative to one another based on the plurality of
paths.

20. The method of claim 19 further comprising, as a result
of completing a geographically traversable segment, receiv-
ing a user interface element from the centralized server and
as a result, receiving user input into the user interface
element.

* * * * *